US011660657B2

(12) United States Patent
Rodenburg et al.

(10) Patent No.: US 11,660,657 B2
(45) Date of Patent: *May 30, 2023

(54) BUS BAR TO SENSOR WIRE ATTACHMENT USING A BLIND RIVET

(71) Applicant: Rivian IP Holdings, LLC, Irvine, CA (US)

(72) Inventors: Justin Rodenburg, Laguna Beach, CA (US); Nathaniel C. Wynn, Tustin, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,768

(22) Filed: Apr. 12, 2022

(65) Prior Publication Data

US 2022/0274157 A1 Sep. 1, 2022

Related U.S. Application Data

(63) Continuation of application No. 16/683,067, filed on Nov. 13, 2019, now Pat. No. 11,325,179.

(Continued)

(51) Int. Cl.
*H01M 50/569* (2021.01)
*B21J 15/10* (2006.01)
(Continued)

(52) U.S. Cl.
CPC .............. *B21J 15/10* (2013.01); *B21J 15/02* (2013.01); *H01M 10/482* (2013.01);
(Continued)

(58) Field of Classification Search
CPC ............. H01M 50/502; H01M 50/569; H01M 50/507; H01M 50/55; H01M 50/512
See application file for complete search history.

(56) References Cited

U.S. PATENT DOCUMENTS 11,325,179 B2 * 5/2022 Rodenburg ......... H01M 10/482
2005/0078095 A1 4/2005 Ung et al.
(Continued)

FOREIGN PATENT DOCUMENTS

CN 105675022 A 6/2016
CN 108390340 A 8/2018
(Continued)

OTHER PUBLICATIONS

International Preliminary Report on Patentability received for PCT Patent Application No. PCT/US2019/061316, dated May 27, 2021, 9 pages.

(Continued)

*Primary Examiner* — Jane J Rhee
(74) *Attorney, Agent, or Firm* — Haley Guiliano LLP (57) ABSTRACT

Systems and methods that provide an improved mechanism for attaching a sensor wire to a bus bar in a battery module are disclosed. A battery module according to the present disclosure may include a bus bar comprising a rivet hole and a plurality of battery cells electrically coupled to the bus bar. The battery module may also include a sensor wire comprising a terminal end, as well as a blind rivet passing through the rivet hole of the bus bar and coupling the bus bar to the terminal end of the sensor wire. Attaching the sensor wire to the bus bar with a blind rivet may provide one or more of the following mechanical advantages: fast assembly, robustness for low power applications, elimination of the need to wait for an adhesive to cure, and elimination of the need for double-sided access of the bus bar.

20 Claims, 5 Drawing Sheets

Related U.S. Application Data (60) Provisional application No. 62/760,830, filed on Nov. 13, 2018.

(51) Int. Cl.
  *B21J 15/02* (2006.01)
  *H01M 50/55* (2021.01)
  *H01M 50/512* (2021.01)
  *H01M 50/507* (2021.01)
  *H01M 10/48* (2006.01)
  *H01M 50/213* (2021.01)
  *H01M 50/505* (2021.01)

(52) U.S. Cl.
  CPC ....... *H01M 50/213* (2021.01); *H01M 50/505* (2021.01); *H01M 50/507* (2021.01); *H01M 50/512* (2021.01); *H01M 50/55* (2021.01); *H01M 50/569* (2021.01)

(56) References Cited

U.S. PATENT DOCUMENTS

| | | |
|---|---|---|
| 2010/0015519 A1 | 1/2010 | Trester et al. |
| 2013/0309539 A1 | 11/2013 | Yoshioka et al. |
| 2015/0064524 A1 | 3/2015 | Noh et al. |
| 2015/0372354 A1 | 12/2015 | Nakano et al. |
| 2018/0123188 A1 | 5/2018 | Dawley et al. |

FOREIGN PATENT DOCUMENTS

| | | |
|---|---|---|
| JP | 10-193506 A | 7/1998 |
| JP | 2008-186725 A | 8/2008 |
| JP | 5100140 B2 | 12/2012 |
| WO | 2018/026726 A1 | 2/2018 |

OTHER PUBLICATIONS

International Search Report and Written Opinion received for PCT Patent Application No. PCT/US2019/061316, dated Jan. 29, 2020, 11 pages.

* cited by examiner

BUS BAR TO SENSOR WIRE ATTACHMENT USING A BLIND RIVET

CROSS REFERENCE TO RELATED APPLICATION

This application claims the benefit of U.S. Provisional Patent Application No. 62/760,830 filed Nov. 13, 2018, the disclosure of which is hereby incorporated by reference herein in its entirety.

SUMMARY

Battery cells are often packaged into battery modules that include multiple battery cells and bus bars. A battery cell in a battery module may have one terminal connected to a first bus bar and another terminal connected to a second bus bar. A battery monitoring system may measure and balance the voltage between bus bars (and thereby across one or more battery cells) within the module through voltage sense wires attached to each bus bar. A voltage sense wire can be attached to a bus bar using, for example, a bolt or weld. Using a bolt requires significant z-dimensional space as well as access to both sides of the bus bar, both of which may be difficult to achieve with tightly-packed battery modules. Additionally, the bolt may loosen over time. Using a weld typically requires ultrasonic welding, which may fail when originally performed or over time due to temperature changes or other factors.

In view of the foregoing, it would be advantageous to provide an improved mechanism for attaching a sensor wire to a bus bar in a battery module.

Systems and methods are disclosed herein that provide an improved mechanism for attaching a sensor wire to a bus bar in a battery module. The wire-to-bus-bar attachment of the present disclosure, which uses a blind rivet, may provide one or more of the following mechanical advantages: fast assembly, robustness for low power applications, elimination of the need to wait for an adhesive to cure, space saving, and elimination of the need for double-sided access of the bus bar. A battery module according to the present disclosure may include a bus bar comprising a rivet hole. The battery module may also include a plurality of battery cells, where two or more of the battery cells are electrically coupled to the bus bar. The battery module may also include a sensor wire comprising a terminal end, as well as a blind rivet passing through the rivet hole of the bus bar and coupling the bus bar to the terminal end of the sensor wire. In some embodiments, the sensor wire may include a voltage sense wire. A blind rivet can provide a significant compression force between the terminal end of the sensor wire and the bus bar, thereby increasing electrical conductivity between the two.

In some embodiments, the terminal end of the sensor wire may include a ring terminal (also known as a ring crimp terminal). In such embodiments, the blind rivet passes through the rivet hole of the bus bar and the ring terminal, providing a compression force to the bus bar and the ring terminal, thereby forming an electrically conductive bond.

In some embodiments, the terminal end of the sensor wire may form a loop. In such embodiments, the blind rivet passes through the rivet hole of the bus bar and the loop, providing a compression force to the bus bar and the loop, thereby forming an electrically conductive bond.

In some embodiments, the blind rivet may include a mandrel head, a rivet shaft, and a rivet head. The rivet shaft may pass through the bus bar and the terminal end of the sensor wire may be adjacent to the rivet head. The battery module may further include an adhesive applied to one or more of the rivet head and the mandrel head.

In some embodiments, the battery module may include an additional bus bar. One terminal of a battery cell of the plurality of battery cells may be electrically coupled to the first bus bar, and another terminal of the battery cell may be electrically coupled to the additional bus bar. The additional bus bar may be coupled to an additional sensor wire with an additional blind rivet.

In some embodiments, the battery module may include a voltage sensing module coupled to the sensor wire and the additional sensor wire. The voltage sensing module may monitor voltage using the sensor wire and the additional sensor wire.

In some embodiments, the plurality of battery cells may be electrically connected in parallel.

In some embodiments, the two or more battery cells electrically coupled to the bus bar may be electrically coupled to the bus bar along a length-wise dimension of the bus bar. The rivet hole may also be located along the length-wise dimension of the bus bar.

In some embodiments, the blind rivet extends beyond the bus bar and the ring terminal by an amount less than 5 millimeters (e.g., in the range of 1 to 5 millimeters).

In some embodiments, a method of manufacturing a battery monitoring system is used to provide an improved mechanism for attaching a sensor wire to a bus bar in a battery module. The method may include providing a bus bar having a rivet hole and providing a plurality of battery cells. The method may further include coupling two or more of the battery cells to the bus bar. The method may further include providing a sensor wire having a terminal end and providing a blind rivet. The method may further include passing the blind rivet through the terminal end of the sensor wire and the rivet hole. The method may further include activating the blind rivet to couple the terminal end of the sensor wire to the bus bar.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Systems and methods are disclosed herein that provide an improved mechanism for attaching a sensor wire to a bus bar in a battery module. In the present disclosure, a sensor wire is attached to a bus bar in a battery module using a blind rivet. The sensor wire may include a voltage sense wire. The bus bar may have a rivet hole for the blind rivet to pass through, and there may be multiple bus bars in the battery module. The blind rivet passing through the rivet hole may couple the bus bar to a terminal end of a sensor wire by providing a compression force to the bus bar and terminal end, thereby forming an electrically conductive bond. The terminal end of the sensor wire may comprise one of a ring terminal, a loop of wire, or another electrically conductive mechanism.

There may be multiple battery cells electrically coupled to a bus bar in the battery module. Some battery cells may be electrically coupled to the bus bar at one terminal and electrically coupled to an additional bus bar at a different terminal, resulting in these battery cells being electrically connected in parallel. There may be multiple rows of battery cells in the battery module, where each row includes one or more sections of battery cells connected in parallel. The different sections of battery cells in the rows may be connected to each other in series. A sensor wire electrically coupled to a bus bar via a blind rivet may be used to monitor voltage or another characteristic of the bus bar. The voltage of the bus bar may be approximately (e.g., within a range of 10-500 mV of) the same voltage as that of a terminal end of a battery cell that is electrically coupled to the bus bar. In some embodiments, the voltage of the busbar is within 50 mV of the voltage at the terminal end of a battery cell. This voltage variation scales roughly linearly with current flow and will be substantially lower during normal operation. A sensor wire electrically coupled to a bus bar and an additional sensor wire electrically coupled to an additional bus bar may be used by a voltage sensing module to monitor a voltage difference across the bus bar and the additional bus bar. In the case where a battery cell is electrically connected at one terminal to the bus bar and at another terminal to the additional bus bar, the voltage difference across the bus bar and the additional bus bar may be approximately (e.g., within 10-500 mV of) the voltage difference across the battery cell.

Figure 1:
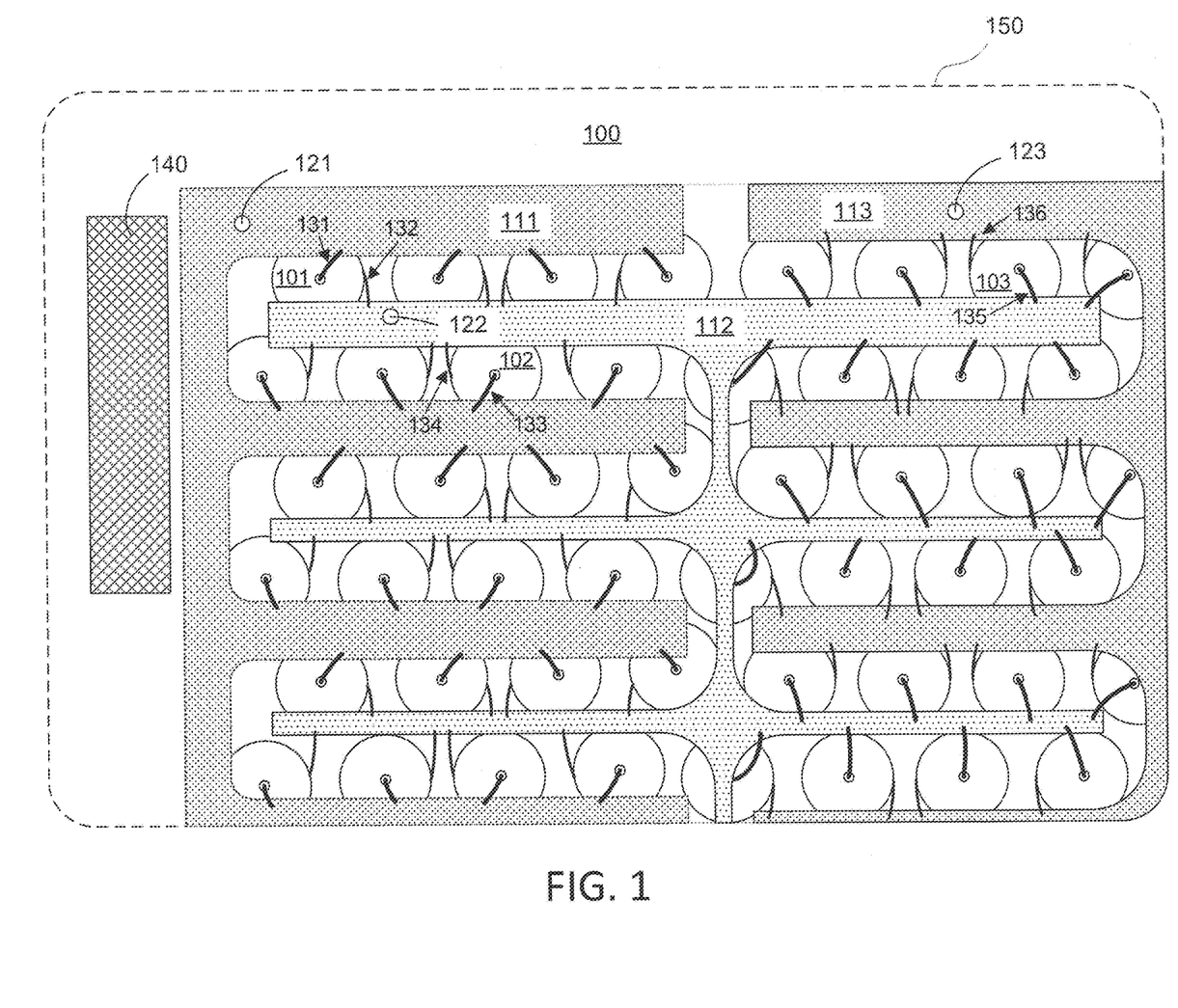
FIG. 1 shows a partial top view of a battery module in accordance with some embodiments of the present disclosure.

FIG. 1 shows a partial top view 150 of a battery module 100 in accordance with some embodiments of the present disclosure. Battery module 100 includes bus bars 111, 112, and 113. Bus bar 111 has rivet hole 121. Similarly, bus bar 112 has rivet hole 122, and bus bar 113 has rivet hole 123. In some cases, a bus bar may have multiple rivet holes. Each rivet hole may be positioned along a respective bus bar at a position where only single-sided access to the bus bar is available. In some cases, a rivet hole may be positioned along a lengthwise dimension of a bus bar. Additionally, each rivet hole may be positioned such that a wire may be run from the rivet hole to a component such as voltage sensing module 140. In one example, respective wires (not shown) leading from rivet holes 121, 122, and 123 may be run to voltage sensing module 140. In another example, respective wires leading from rivet holes 121 and 122 may be run to voltage sensing module 140 while a wire leading from rivet hole 123 may be run to another voltage sensing module (not shown) that is closer spatially to rivet hole 123 than voltage sensing module 140. In some cases, a voltage sensing module such as voltage sensing module 140 may be adjacent to the bus bars and internal to the battery module. In other cases, a voltage sensing module may be external to the battery module.

Battery module 100 includes multiple battery cells, including battery cells 101, 102, and 103. Each battery cell may have a terminal end (e.g., a center electrode) that is electrically coupled to one bus bar and another terminal end (e.g., a rim electrode) that is electrically coupled to another bus bar. For example, battery cell 101 may be electrically coupled at one terminal to bus bar 111 through lead 131 and electrically coupled at another terminal to bus bar 112 through lead 132. Similarly, battery cell 102 may be electrically coupled at one terminal to bus bar 111 through lead 133 and electrically coupled at another terminal to bus bar 112 through lead 134. The connection of respective first terminals of battery cells 101 and 102 to bus bar 111 and the connection of respective second terminals of battery cells 101 and 102 to bus bar 112 result in battery cells 101 and 102 being electrically connected in parallel. Additionally, battery cell 103 may be electrically connected at one terminal to bus bar 112 through lead 135 and electrically coupled at another terminal to bus bar 113 through lead 136. As a result of these connections, battery cells 101 and 102 are electrically connected in parallel with each other, as well as in series with battery cell 103.

It will be understood that battery module 100 of FIG. 1 is merely illustrative and that any suitable battery module having bus bars may be used in accordance with the present disclosure. For example, battery module 100 can include additional or fewer battery cells. The battery cells may be of any suitable shape and positioned in any suitable arrangement. In addition, the bus bars of battery module 100 can be of any suitable shape and size. In some embodiments, the bus bars can be simple rectangular pieces of conductive material. In some embodiments, the busbar is plated with an electrically conductive corrosion-resistant material such as nickel, which may be applied through, for example, an electroless or electrolytic process.

Figure 2A:
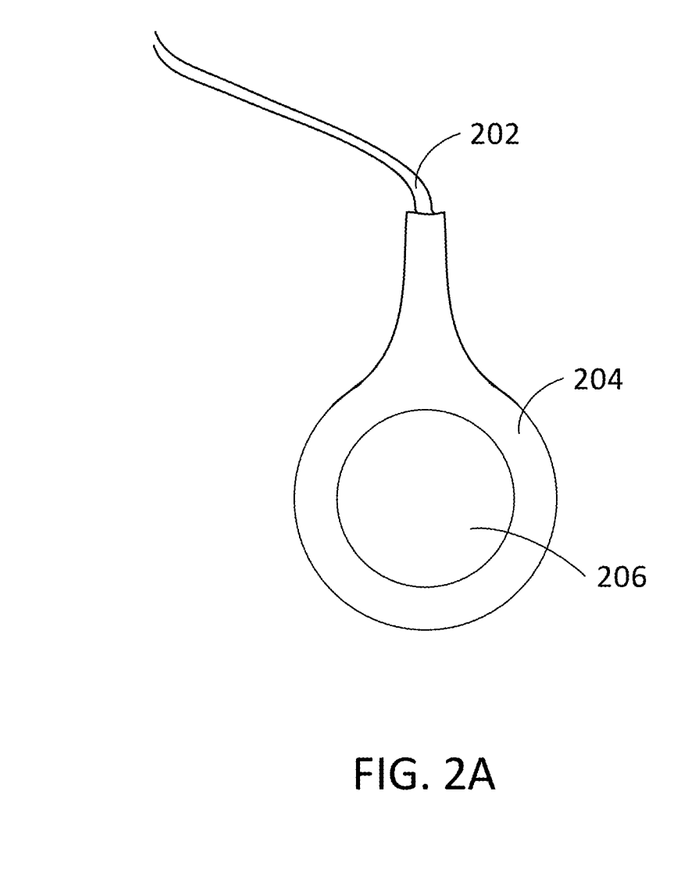
FIG. 2A shows a top view of a terminal end of a sensor wire comprising a ring terminal in accordance with some embodiments of the present disclosure.

FIG. 2A shows a top view of a terminal end of a sensor wire 202 comprising a ring terminal 204 in accordance with some embodiments of the present disclosure. Sensor wire 202 may comprise an electrically conductive material such as copper, aluminum, silver, or gold. In some cases, sensor wire 202 may have an insulated outer layer or coating. Ring terminal 204 may comprise an electrically conductive material such as copper, aluminum, or tin. In some embodiments, ring terminal 204 may be plated with an electrically conductive corrosion-resistant material such as nickel, tin, or silver, which may be applied through, for example, an electroless or electrolytic process. Ring terminal 204 may be soldered or otherwise electrically connected to an end of sensor wire 202. As shown, ring terminal 204 may have a generally circular shape with an opening 206. In other cases, ring terminal 204 may be generally elliptical, rectangular, or otherwise shaped. Similarly, opening 206 may be circular, elliptical, rectangular, or another shape.

Figure 2B:
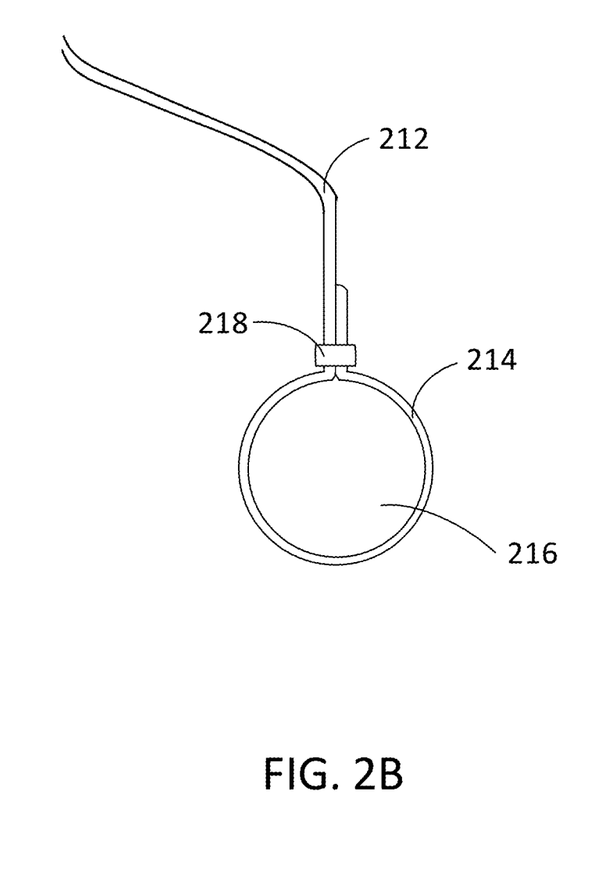
FIG. 2B shows a top view of a terminal end of a sensor wire comprising a loop in accordance with some embodiments of the present disclosure.

FIG. 2B shows a top view of a terminal end of a sensor wire 212 comprising a loop 214 in accordance with some embodiments of the present disclosure. Sensor wire 212 may comprise an electrically conductive material such as copper, aluminum, silver, or gold. Sensor wire 212 may form loop 214 with an opening 216. Loop 214 and opening 216 may be a generally circular shape, as shown. In another example, loop 214 and opening 216 may be elliptical, rectangular, or another shape. Loop 214 may be formed by joining two parts of sensor wire 204, for example with a clamp 218, as shown, or other fastening mechanism. In another example (not shown), one portion of sensor wire 212 may be twisted around another portion of sensor wire 212 in order to form loop 214 and opening 216.

Figure 3:
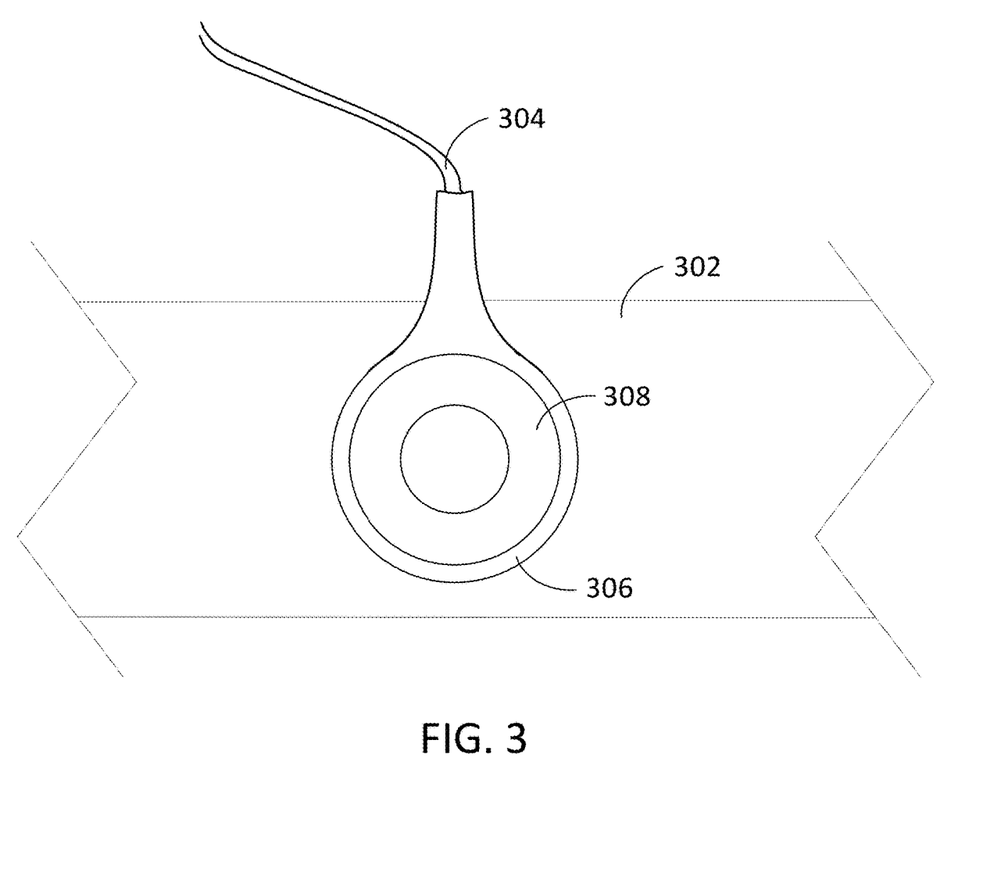
FIG. 3 shows a top view of a terminal end of a sensor wire coupled to a bus bar with a blind rivet in accordance with some embodiments of the present disclosure.

FIG. 3 shows a top view of a terminal end of a sensor wire 304 coupled to a bus bar 302 with a blind rivet 308 in accordance with some embodiments of the present disclosure. As shown, the terminal end of sensor wire 304 may be a ring terminal 306 similar to ring terminal 204, discussed above in relation to FIG. 2A. In another example, the terminal end of sensor wire 304 may be a wire loop similar to loop 214, discussed above in FIG. 2B. In still other examples, the terminal end of sensor wire 304 may be another electrically conductive attachment element. Blind rivet 308 may pass through a rivet hole in the bus bar similar to rivet holes 121, 122, and 123, discussed above in relation to FIG. 1. Blind rivet 308 may provide a compression force to bus bar 302 and the terminal end of sensor wire 304 (represented in FIG. 3 by ring terminal 306), thereby forming an electrically conductive bond between the bus bar and the wire. As discussed above, sensor wire 304 may be connected to a component such as voltage sensing module 140. A voltage or other measurement of bus bar 302 may be monitored through sensor wire 304. In the case in which bus bar 302 is electrically coupled to the terminal end of a battery cell, the voltage of bus bar 302 may be approximately (e.g., within 10-500 mV of) the same as the voltage at the terminal end of the battery cell. Thus, the sensor wire 304 may enable monitoring of a terminal end of a battery cell that is electrically coupled to the bus bar.

Figure 4:
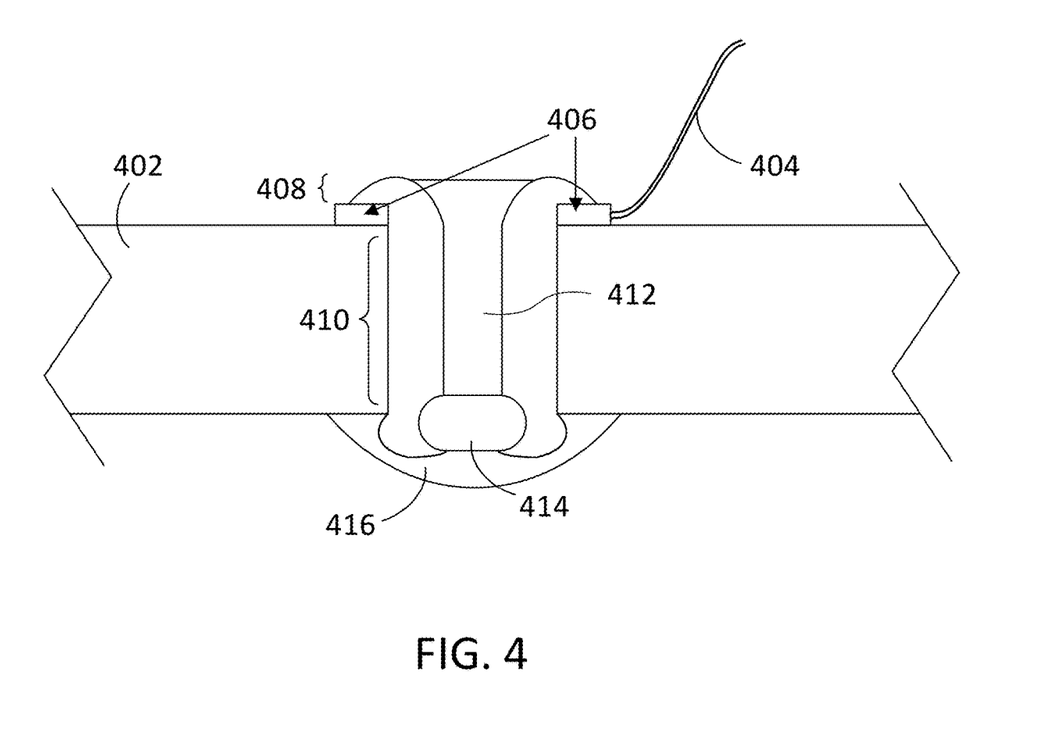
FIG. 4 shows a cross-sectional view of a blind rivet passing through a hole in a bus bar in accordance with some embodiments of the present disclosure.

FIG. 4 shows a cross-sectional view of a blind rivet passing through a hole in a bus bar 402 in accordance with some embodiments of the present disclosure. The blind rivet may provide a compression force between bus bar 402 and a terminal end 406 of sensor wire 404. This compression force may result in an electrically conductive bond. In some embodiments, bus bar 402 corresponds to bus bars 111, 112, 113, and 302, as discussed above in relation to FIGS. 1 and 3. Terminal end 406 of sensor wire 404 may be similar to ring terminal 204 or wire loop 214 as discussed above in relation to FIGS. 2A and 2B. The blind rivet of FIG. 4 may include a rivet head 408, a rivet body 410 with rivet shaft 412, and a mandrel head 414. Rivet head 408 may be adjacent to one side of bus bar 402 and mandrel head 414 may be adjacent to another side of bus bar 402. Rivet body 410 may run through a hole in bus bar 402 similar to rivet holes 121, 122, and 123, as discussed above in relation to FIG. 1. Rivet body 410 may comprise a generally cylindrical shape. Rivet shaft 412 is a cavity in rivet body 410 that may be a generally cylindrical shape. Rivet shaft 412 may contain a mandrel body (not shown) before the blind rivet is activated. The activation of the blind rivet may include pulling a mandrel body out of rivet shaft 412, in a direction away from mandrel head 414 and toward rivet head 408, resulting in mandrel head 414 deforming rivet body 410 and detaching from the mandrel body. The activation of the blind rivet is performed with a tool that is positioned on the top surface of bus bar 402. Access to the bottom surface of bus bar 402 is not required for activation. In some embodiments, an adhesive may be applied to rivet head 408 (not shown for clarity). Additionally or alternatively, as shown, an adhesive 416 may be applied to the end of the blind rivet corresponding to the mandrel head. The adhesive may include, for example, one or more of a methacrylate formula (i.e., of resin and hardener), a urethane adhesive, and an epoxy. Adhesive 416 is optional and may protect parts of the blind rivet and ring terminal from the inside environment of a battery module. Adhesive 416 may also prolong the useful life of the connection. In addition, adhesive 416 may be used in situations where extra strength is required and may strengthen the wire-to-bus-bar attachment to be stronger than a bolt or weld attachment. In some embodiments, adhesive 416 can be applied between terminal end 406 and rivet head 408.

Figure 5:
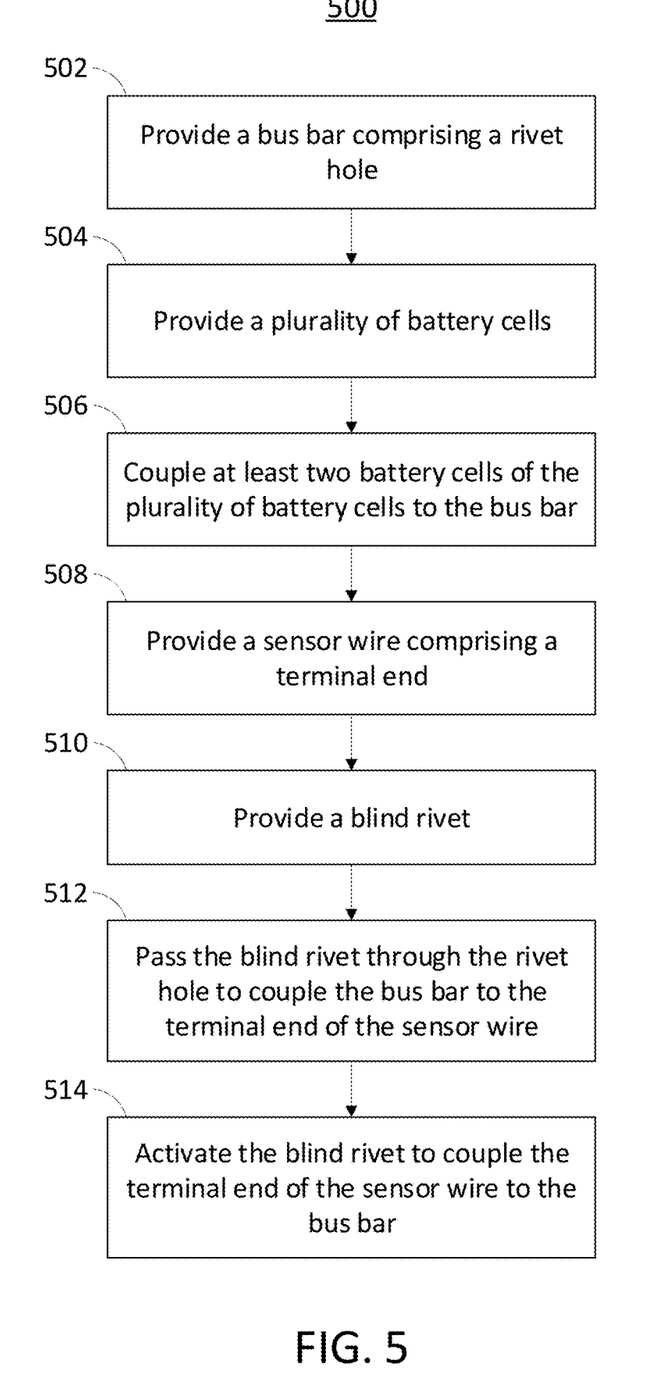
FIG. 5 is a flowchart of a method for manufacturing a battery monitoring system in accordance with some embodiments of the present disclosure.

The present disclosure also includes methods of manufacturing a battery module that provides an improved mechanism for attaching a sensor wire to a bus bar in a battery module. FIG. 5 is a flowchart 500 of a method for manufacturing a battery monitoring system in accordance with some embodiments of the present disclosure. In some embodiments, the battery monitoring system includes one or more bus bars, one or more battery cells, and a voltage sensing module, as shown in FIG. 1. In some embodiments, the battery monitoring system includes a sensor wire with a terminal end in the form of a ring terminal or wire loop, as shown in FIG. 2. In some embodiments, the battery monitoring system includes a blind rivet that electrically couples a sensor wire to a bus bar, as shown in FIGS. 3 and 4.

At step 502, a bus bar comprising a rivet hole is provided. The rivet hole may be along a length-wise dimension of the bus bar, as shown in FIG. 1. Multiple bus bars comprising rivet holes may also be provided, as shown in FIG. 1. At step 504, a plurality of battery cells is provided. At step 506, at least two battery cells of the plurality of battery cells are coupled to a bus bar. As shown in FIG. 1, the battery cells may be coupled to a bus bar along a length-wise dimension of the bus bar. As discussed above and shown in FIG. 1, the battery cells may be coupled to one bus bar at a respective terminal end of each battery cell and another bus bar at a respective other terminal end of each battery cell. At step 508, a sensor wire comprising a terminal end is provided. The terminal end of the sensor wire may include a ring terminal or loop of wire, as shown in FIGS. 2A and 2B. At step 510, a blind rivet is provided. The blind rivet may include a rivet head, rivet body, rivet shaft, mandrel body, and mandrel head, as partially shown in FIG. 4. Providing each component may include manufacturing or assembling the component itself, or obtaining the component from a supply of components.

At step 512, the blind rivet is passed through the rivet hole to couple the bus bar to the terminal end of the sensor wire. At step 514, the blind rivet is activated to couple the terminal end of the sensor wire to the bus bar. Activating the blind rivet may involve removing the mandrel body from the blind rivet and detaching the mandrel body from the mandrel head. The result of the activation of the blind rivet may be an electrically conductive bond between the bus bar and the terminal end of the sensor wire. In some embodiments, an adhesive may be applied to one or more ends of the blind rivet (i.e., the end of the blind rivet corresponding to the mandrel head or the end of the blind rivet corresponding to the rivet head).

While the foregoing disclosure discusses using a blind rivet to attach a voltage sense wire to a bus bar, the disclosed blind rivet attachment methods are not limited to a voltage sense wire and a bus bar. For example, the blind rivet may be used for the attachment of any sensor or device (e.g., a thermistor) that measures analog values of a component. For example, thermistors are available in a ring terminal package and thus the techniques of the present disclosure can be used to attach a thermistor to a surface. In some embodiments, blind rivets may be used to attach both a voltage sense wire and a thermistor to a bus bar of a battery module. In such embodiments, the battery monitoring system can monitor both the voltage and temperature of the bus bar.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An assembly comprising:
   a conductive bar coupled to at least two battery cells, wherein the conductive bar comprises a hole;
   a lead wire comprising a terminal end;
   a blind rivet passing through the hole and coupling the terminal end of the lead wire to the conductive bar, wherein the blind rivet comprises two ends; and
   an adhesive applied over at least one of the two ends of the blind rivet.

2. The assembly of claim 1, wherein the blind rivet compresses the terminal end against the conductive bar, thereby forming an electrically conductive bond.

3. The assembly of claim 1, wherein:
   the terminal end of the lead wire comprises a ring terminal; and
   the blind rivet passes through the ring terminal.

4. The assembly of claim 1, wherein:
   the terminal end of the lead wire forms a loop; and
   the blind rivet passes through the loop.

5. The assembly of claim 1, wherein the adhesive is applied over the two ends of the blind rivet.

6. The assembly of claim 1, wherein:
   the blind rivet further comprises a rivet shaft;
   the rivet shaft passes through the conductive bar;
   one of the two ends of the blind rivet comprises a rivet head; and
   the terminal end is adjacent to the rivet head.

7. The assembly of claim 1, wherein the two ends comprise a rivet head and a mandrel head.

8. The assembly of claim 1, wherein the terminal end comprises an electrically conductive mechanism.

9. The assembly of claim 1, wherein the lead wire comprises a voltage sense wire.

10. The assembly of claim 1, further comprising an additional conductive bar, wherein:
    a first terminal of a battery cell of the at least two battery cells is electrically coupled to the conductive bar;
    a second terminal of the battery cell is electrically coupled to the additional conductive bar; and
    wherein the additional conductive bar is coupled to an additional lead wire with an additional blind rivet.

11. The assembly of claim 10, wherein the lead wire and the additional lead wire are configured to provide voltage readings.

12. The assembly of claim 1, wherein the at least two battery cells are electrically connected in parallel.

13. The assembly of claim 1, wherein:
    the at least two battery cells are electrically coupled to the conductive bar along a length-wise dimension of the conductive bar; and
    the rivet hole is located along the length-wise dimension of the conductive bar.

14. The assembly of claim 1, wherein the blind rivet extends beyond the conductive bar and the ring terminal by an amount in the range of 1 to 5 millimeters.

15. An assembly comprising:
    a blind rivet passing through a hole of a conductive bar that couples an end of a lead wire to the conductive bar, wherein the blind rivet comprises two ends; and
    an adhesive applied over at least one of the two ends of the blind rivet.

16. A method of manufacturing, comprising:
    providing a conductive bar comprising a hole;
    providing at least two battery cells;
    coupling the at least two battery cells to the conductive bar;
    providing a wire comprising a terminal end;
    providing a blind rivet;
    passing the blind rivet through the terminal end of the wire and the hole;
    activating the blind rivet to couple the terminal end of the wire to the conductive bar, wherein the activated blind rivet comprises a first end adjacent to the terminal end of the wire and a second end adjacent to the conductive bar; and
    applying an adhesive over at least one of the two ends.

17. The method of claim 16, wherein the terminal end of the wire comprises one of a ring terminal and a loop of wire.

18. The method of claim 16, further comprising applying an adhesive over both ends of the rivet.

19. The method of claim 16, further comprising coupling the wire to a battery monitoring system.

20. The method of claim 16, wherein the wire comprises a voltage sense wire.

* * * * *